Feb. 17, 1959  R. T. KLEMPAY  2,874,266
WELDING APPARATUS, PARTICULARLY FOR CONTINUOUS STRIP LINES
Filed Feb. 17, 1954  5 Sheets-Sheet 1

INVENTOR
RAYMOND T. KLEMPAY
BY *Francis J. Klempay*
ATTORNEY

Feb. 17, 1959 R. T. KLEMPAY 2,874,266
WELDING APPARATUS, PARTICULARLY FOR CONTINUOUS STRIP LINES
Filed Feb. 17, 1954 5 Sheets-Sheet 3
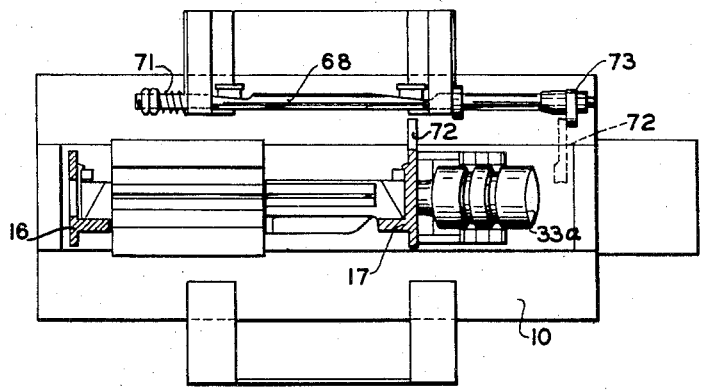
Fig. 5
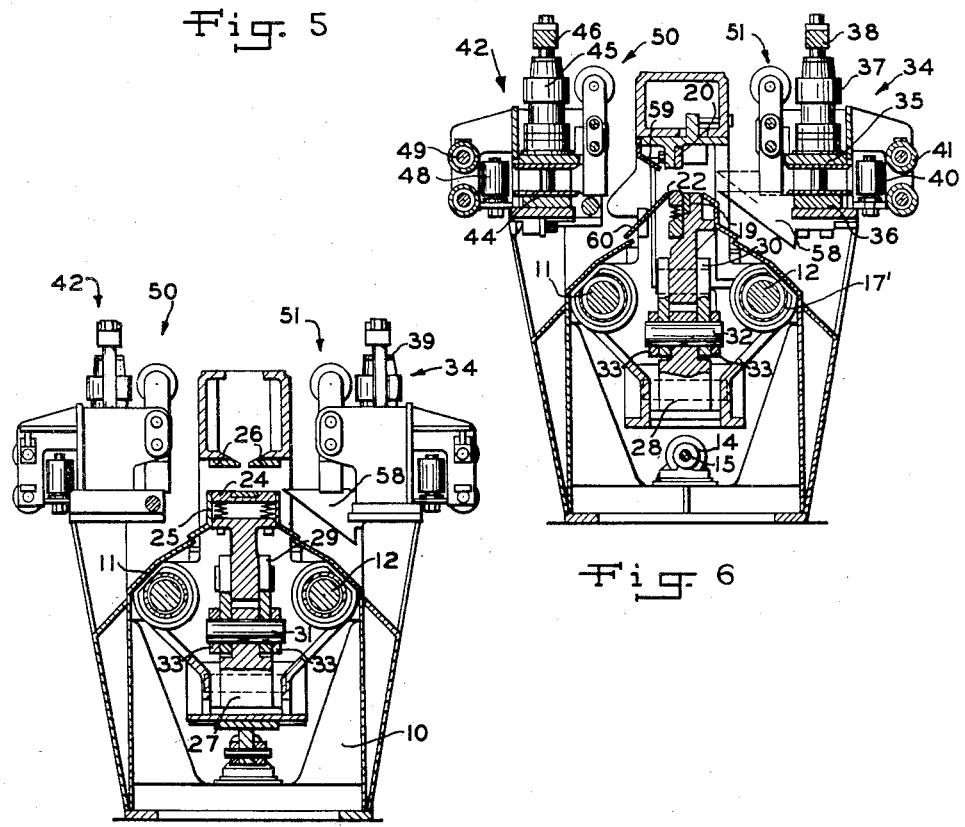
Fig. 6
Fig. 7
INVENTOR
RAYMOND T. KLEMPAY
BY Francis J. Klempay
ATTORNEY

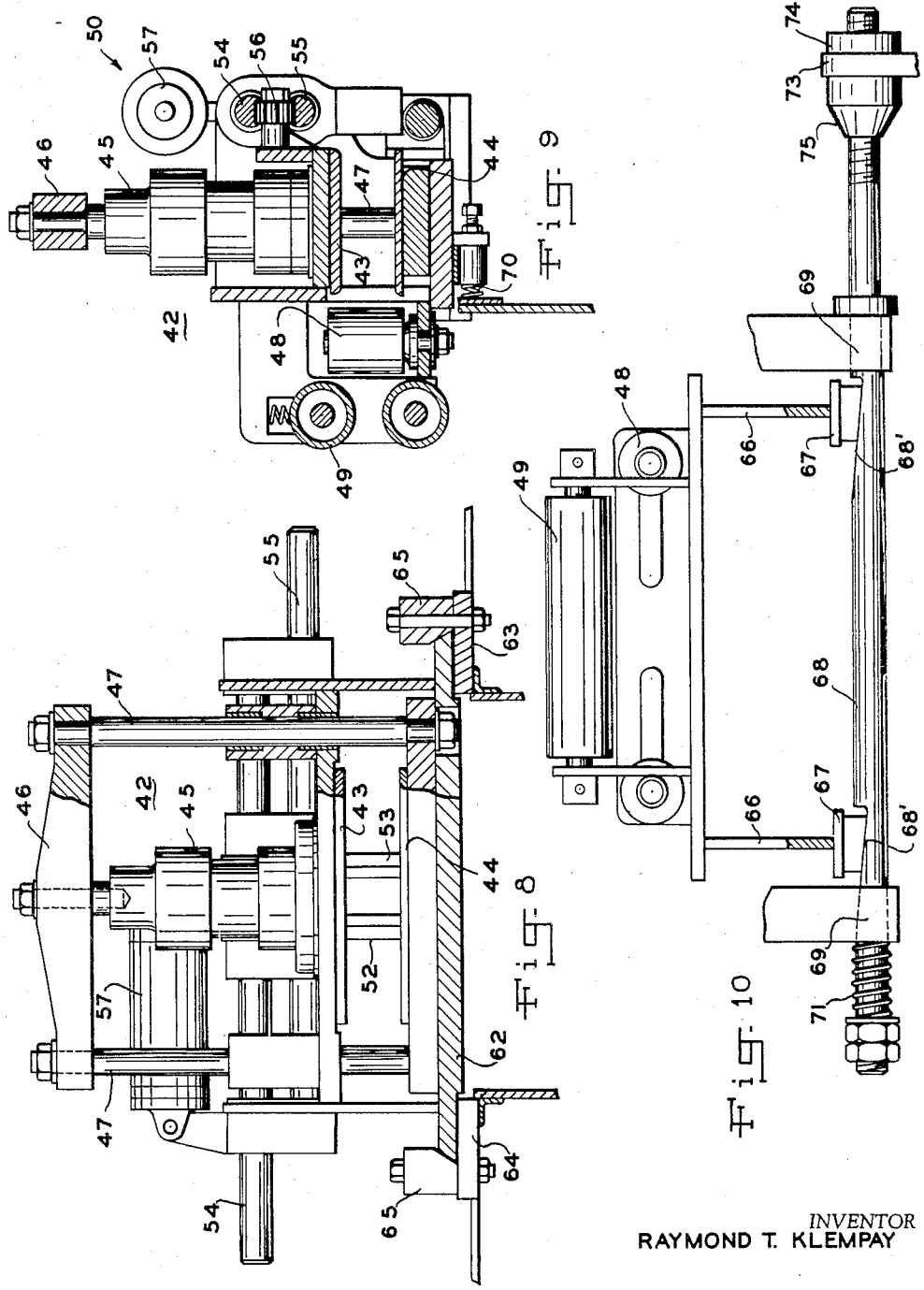

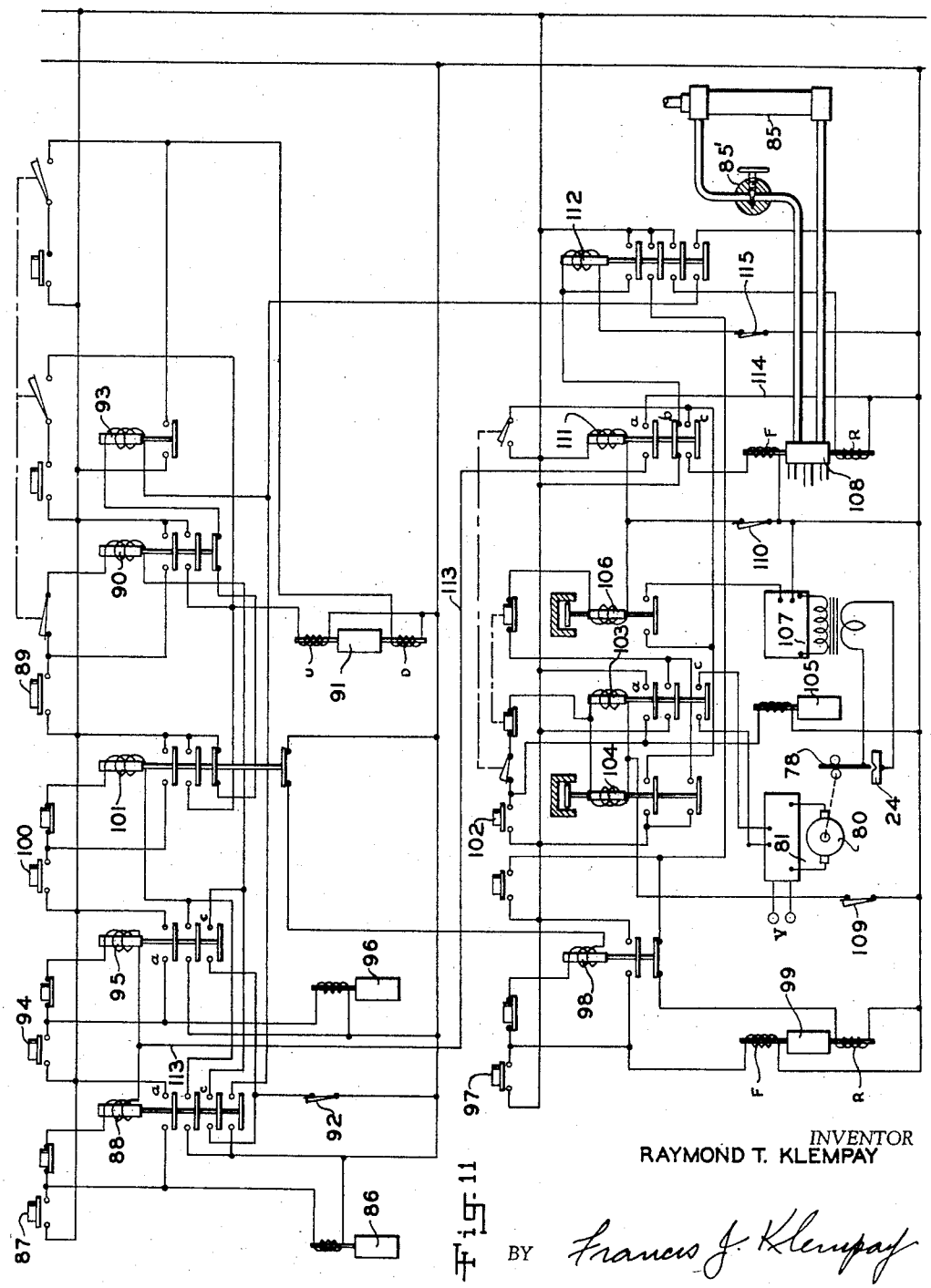

United States Patent Office 2,874,266
Patented Feb. 17, 1959

2,874,266

WELDING APPARATUS, PARTICULARLY FOR CONTINUOUS STRIP LINES

Raymond T. Klempay, Youngstown, Ohio

Application February 17, 1954, Serial No. 410,840

12 Claims. (Cl. 219—124)

The present invention relates to welding apparatus, and more particularly to apparatus for effecting the end-to-end welding of separate sheets or strips of material to form a continuous line of strip, for example.

As an overall object, the present invention seeks to provide an improved and simplified apparatus for incorporation into continuous strip processing lines, for example, which is operative to prepare the end portions of separate sheets or strips of material and to weld the same together to form a continuous length of material.

In the end-to-end welding of sheet and strip material it is common practice to first prepare the adjacent ends of the material, as by shearing, and then to weld the ends together while the same are held by clamps in predetermined relation. Where the welding operations form a step in the continuous processing of the material the various operations must be completed at high speed, as will be understood, so that the other processing equipment may remain in operation at all times. Thus it has been heretofore proposed to provide a combined apparatus which is operative to first clamp and then shear the adjacent ends of strip or sheet material, and to thereafter effect the weld while the material remains fixed in the clamps. This arrangement is desirable in that the strip ends may be accurately aligned when sheared, and the welding operation may quickly follow the shearing operation so that the entire process is completed in a relative minimum of time.

While various apparatus has been heretofore proposed for effecting end-to-end welding of sheet and strip in accordance with the above procedure, I have found the same to be of a more or less complicated nature and to have other undesirable features. Accordingly, it is the primary object of this invention to provide a combined apparatus for carrying out the above described operations which is of a substantially improved and simplified character, as compared with prior apparatus for the same general purpose, and which is operative to effect the welding operation in an improved manner.

As a more specific object, the present invention seeks to provide a combined welding apparatus having means for both shearing and welding the ends of adjacent strip sections following clamping of the same, the apparatus being characterized by the provision of a simplified unitary carriage device which is movable transversely of the strip section for positioning the shearing and welding apparatus selectively in operative position in accordance with the desired procedure.

Further to the above object, the apparatus of the present invention incorporates an improved unitary welding clamp and shear apparatus which is operated by a single actuating device. That is, in accordance with the teachings of the present invention, although the shear is operated during one phase of the procedure, and the welding clamps during another, a single fluid cylinder or other device may be employed for both operations.

Although the apparatus of the present invention is not necessarily so restricted, it is particularly adapted for welding by the submerged arc process wherein the adjacent ends of the material are spaced apart slightly and joined together by the addition of a fusable welding electrode. Following the preferred practice in the handling of the strip material, the adjacent end portions are clamped prior to shearing, and as both strip sections are sheared at the same station the ends are in abutting relation immediately following the shearing operation. Thus, it has been heretofore proposed to shift or back off one of the strip holding clamps after the shearing operations so that the proper spacing may be obtained. And it is one of the more specific objects of this invention to provide an improved and simplified mechanism for backing off one of the strip holding clamps automatically, following the shearing operations and prior to the welding operation.

A further object of the invention resides in the provision in a welding device of the type and having characteristics set forth above of improved control arrangements for monitoring the various steps required in a complete welding operation.

The above and other objects and advantages of the invention will become apparent upon full consideration of the following detailed specification and accompanying drawing wherein is shown a preferred embodiment of my invention.

In the drawing:

Figure 5 is a top view of the apparatus of my invention, with parts broken away to show details of construction;

Figures 6 and 7 are section views taken generally along line VI—VI and line VII—VII respectively of Figure 2;

Figures 8, 9 and 10 are enlarged fragmentary views showing a strip holding clamp, forming a part of the apparatus of Figure 1, and showing details of the mechanism for shifting or backing off the clamp; and Figure 11 is a simplified schematic representation of the control system employed in connection with the operation of the apparatus of Figure 1.

Figure 1:
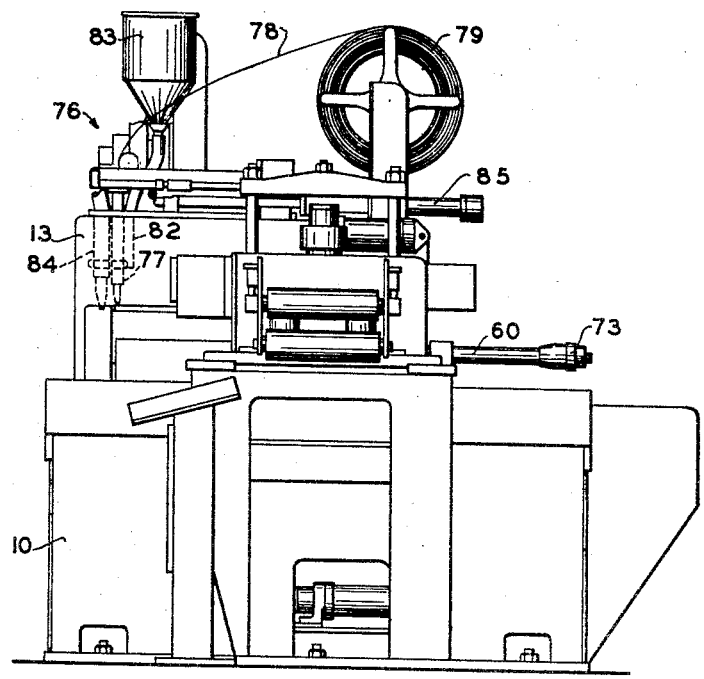
Figure 1 is a front elevation of a combined welding apparatus constructed in accordance with the teachings of my invention.

Referring now to the drawing, the numeral 10 designates generally the main frame or base of the welding apparatus, the base being elongated somewhat in a direction transverse to the pass line of the material and being open at the top, at least. Secured at the spaced end walls of the base 10 are spaced rods 11 and 12, of relatively large diameter which slidably support a combined shear and welder carriage structure, designated generally by the numeral 13.

In accordance with the teachings of the invention the base 10 is fixed and the carriage 13 is arranged to be shifted transversely with respect to a generally fixed material pass line so that shear and welding mechanisms, in that order, may be positioned in operative relation to the strip material. The rods 11 and 12 provide rigid support for the carriage 13 while permitting a relatively free sliding movement from one side to the other of the base 10. And to effect such sliding movement there is mounted on the base 10, below the carriage 13, a hydraulic traverse cylinder 14, having a long operating stroke. The piston rod 15 of the cylinder 14 is connected to the carriage 13, as clearly shown in Figure 4, so that upon suitable application of pressure to the cylinder the carriage may be shifted from side to side as desired.

Viewed in side elevation, the carriage 13 is generally rectangular in outline, defining a rectangular window-like opening. The sides of the window-like opening are defined by spaced vertical members 16 and 17 which are provided with vertical guide ways for the slidable reception of a combined shear and welding platen carrier 18. As shown in Figures 6 and 7, the side members 16 and 17 are provided with outwardly extending portions having bearings 16' and 17' therein which slidably engage the supporting rods 11 and 12.

Figure 4:
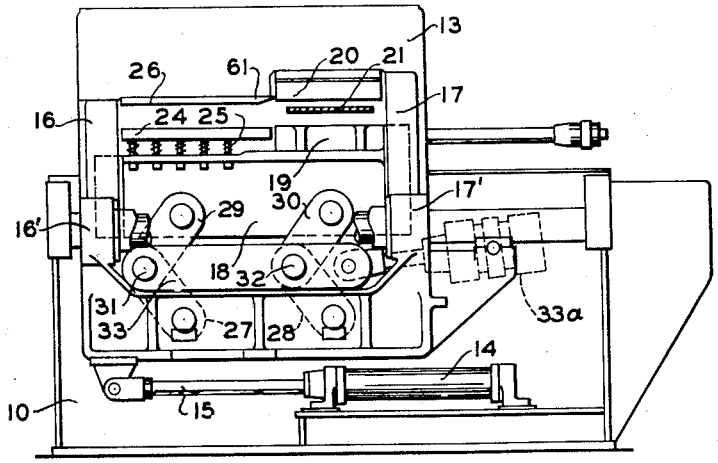
Figure 4 is a side elevation of the apparatus of Figure 1, with parts broken away to show the unitary shear and welder carriage.

Referring now to Figures 4 and 6, there is mounted at the upper right hand portion of the carrier 18 a shear blade 19 which is adapted to have cooperative shearing engagement with a second shear blade 20 mounted rigidly on the upper cross member of the carriage 13. The arrangement is such that upon upward movement of the carrier 18 the blade 19 moves into shearing engagement with the blade 20 for shearing a strip section 21 positioned between the blades. In accordance with usual shear construction there is provided adjacent the front face of the lower blade 19 a resiliently mounted block 22 which operates following a shearing operation to force the strip material upwardly, clear of the blade.

At the upper left hand portion of the carrier 18 is mounted an electrically conductive welding platen 24 which, in accordance with the teachings of the invention, is resiliently carried by a plurality of coil springs 25 and adapted for a relatively substantial vertical movement. Positioned directly above the platen 24 and secured rigidly to the upper cross member of the carriage 13 are spaced clamping plates 26. As will be readily understood, upon upward movement of the platen 24, with the carrier 18, the platen and clamping plates will operate to clamp the adjacent end portions of strip sections positioned therebetween. This is, of course, not the primary or principal apparatus for clamping the strip sections. However, it is necessary to accurately align the adjacent ends of the strip sections as well as to establish good electrical contact between the strip section and the platen 24, and the above described clamping mechanism functions to this end. Platen 24 and plates 26 may be comprised of a plurality of separate segments, if desired, so that material of non-uniform thickness may be adequately clamped.

To actuate the carrier 18 in the manner desired I have provided a pair of spaced parallel toggle linkage assemblies comprising links 27 and 28, connected pivotally to the lower cross member of the carriage 13, and links 29 and 30 connected pivotally to the carrier 18. The links 27 and 29 are connected by a pin 31, while links 28 and 30 are connected by a similar pin 32.

Also connecting the pins 31 and 32 are transversely disposed rigid links 33 which maintain the link assemblies 27—29 and 28—30 in parallelism at all times. In the preferred embodiment of the invention the links 33 extend to the right of the link assembly 28—30, as viewed in Figure 4, and are connected at their right hand ends to the piston rod of a hydraulic actuator 33a. The actuator 33a is pivotally mounted on the carriage 13; and upon suitable application of fluid pressure thereto the cylinder 33a will draw the links 32 to the right to straighten the assemblies 27—29 and 28—30, raising the carrier 18 with respect to the carriage 13.

It will be noted that as the carrier 18 is raised, upon actuation of the cylinder 33a, the shear blade 19 and the welding platen simultaneously are raised. Thus, in effecting a shearing operation, for example, the lower blade 19 moves into shearing engagement with the upper blade 20 and the platen 24 comes into contact with the upper clamping plates 26. However, since the platen 24 is mounted resiliently on the plurality of springs 25, the carrier may have continued upward movement to complete the shearing operation after the platen 24 has made contact with the plates 26. On the other hand, when it is desired to clamp adjacent strip ends between the platen 24 and plates 26 the blades 19 and 20 merely move in shearing engagement without actually effecting a shearing operation.

It will be understood, of course, that apparatus of the nature concerned herein is ordinarily incorporated in continuous strip processing lines. And there is generally provided a suitable uncoiling device, not shown, positioned to the left of the welding apparatus, as viewed in Figure 3, in addition to looping equipment and other processing apparatus, also not shown, positioned to the right of the welding apparatus. As one coil is exhausted its trailing end moves into the welding apparatus where it is clamped and sheared preparatory to a welding operation. Next, the leading end of a new coil moves into the machine, and it is likewise clamped and sheared. At this time, both strip ends are clamped at the welding machine; and after first positioning the adjacent ends in a predetermined spaced relationship the welding operation may be performed. Following the welding operation the clamps are released and the new coil is drawn through the processing equipment along with the old coil.

To properly clamp the trailing end portion of an exhausted coil there is provided at the right hand side of the welding apparatus (see Figure 6) a clamping mechanism 34 comprising a fixed upper clamping plate 35 and a movable lower clamping plate 36. Mounted above the fixed upper plate 35 is a fluid cylinder 37 which is connected through a yoke 38 and spaced tie rods 39 to the lower plate 36. The arrangement is such that upon application of fluid pressure to the lower end of the cylinder 37 the lower plate 36 is drawn upwardly into clamping engagement with a strip section passing through the welder.

To guide the strip through the welder there is provided adjacent the clamping mechanism 34 a plurality of guide rollers 40 and 41 which loosely confine the strip both vertically and horizontally as it passes through the welder. Preferably the rollers 40 and 41 are adjustable to accommodate strip of various sizes, up to the capacity of the welding apparatus.

At the entry or left hand side of the welding apparatus there is provided a clamping mechanism 42, which is substantially equivalent to the above described clamping mechanism 34.

Figures 8 and 9 show the clamping mechanism 42 in considerable detail, and it will be observed that there are provided upper and lower clamping plates 43 and 44, the lower plate 44 only being movable. Mounted centrally above the upper plate 43, in fixed relation thereto, is a fluid cylinder 45 which connects through yoke 46 and tie rods 47 with the lower clamping plate 44. Guide rollers 48 and 49 are also provided adjacent the clamping device 42 to loosely confine the strip passing therethrough.

It will be understood that the fixed upper clamping plates 35 and 43, as well as the upper plates 26 of the welding clamp and the lower edge of the upper shear blade 20 are all substantially coplanar so that high accuracy in the shearing and aligning of the strip ends is possible.

In order to insure that adjacent strip ends are properly aligned or registered prior to clamping and welding I have provided aligning or centering devices 50 and 51 adjacent the clamping mechanisms 42 and 34 respectively. The first mentioned centering device 50 is shown in detail in Figures 8 and 9 and comprises a pair of vertically depending side guides 52 and 53, each of which is mounted on a transversely movable rod 54 or 55. The rods 54 and 55 are provided on facing sides with a series of gear teeth which engage a common pinion 56 journaled in a fixed position on the clamping device. The arrangement, of course, is such that upon movement of either of the side guides 52 or 53 the other guide will have an equal but opposite movement so that the guides 52 and 53 are at all times centered with respect to the clamping device 42.

To actuate the centering guides 52 and 53 there is provided a suitable air cylinder 57. And the arrangement is preferably such that upon actuation of the clamping cylinder 45 the cylinder 57 will be simultaneously actuated to urge the guides 52 and 53 toward each other, centering the strip accurately prior to engagement of the stock by the clamping plates 43 and 44.

The centering device 51, positioned adjacent the exit side clamping mechanism 34 is substantially identical to that described above, and no further description will be given herein.

It is usually preferable to provide suitable means, not shown, for adjusting the air pressure applied to the actuators for guides 52 and 53 since in many instances a lower centering force is desired in handling light gauge material.

In the normal operation of the shearing apparatus, the trailing end of an expended coil is first centered and clamped and then sheared upon upward movement of the carrier 18. Following this, the leading end of the next coil is centered and clamped, and then sheared. Of course the trailing end of the first strip is retained in its clamped position as the next coil is brought into position, and hence it is necessary to keep the end of the first coil out of the way of the new coil. To accomplish this there may be provided one or more triangular deflecting members 58 which are rigidly secured to the movable lower clamping plate 36 of the exit side clamp 34. The deflectors 58 have horizontal upper surface portions which are approximately level with the surface of the lower clamping plate 36 and which project inwardly toward the shear blades 19 and 20. The arrangement is such that upon actuation of the clamping device 34 the deflectors 58 are moved upwardly into the position shown in broken lines in Figure 6.

Also upon actuation of the clamp 34 the lower surfaces of the deflectors 58 are moved upwardly and interposed in the path of the incoming end of a new coil whereby the same is engaged and deflected downwardly into a clear area below the clamp 34. After the shear is actuated the crop end merely drops out through the opening below the clamp 34.

Of course, suitable deflecting plates 59 and 60 are provided adjacent the front side of the shear blades 19 and 20 so that the end of a new coil will not accidentally become snagged during threading between the open shear blades.

In accordance with the teachings of the invention, after both the old and the new coils have been properly clamped and sheared the cylinder 14 is energized and the carriage 13 is shifted transversely of the strip, on the supporting rods 11 and 12, to position the welding platen 24 and plates 26 in operative position adjacent the strip. It is often the case that the sheared end of the old coil, having been carried up along the upper shear blade 20 during the shearing operation, sticks rather tightly thereto by mere friction. Thus, to force the strip downwardly under such conditions I have provided a hardened deflector member 61 (see Figure 4) of Stellite, for example, which is positioned between the upper clamping plates 26 and the upper shear blade 20. As the carriage 13 is moved to the right the deflecting member 61 engages the edge of the strip, deflecting it away from the plates 26, thereby preventing scratching or otherwise damaging the plates which are generally constructed of copper or other soft conductive material.

After both the trailing and leading ends respectively of first and second strip sections have been clamped and sheared in the manner set out above the contiguous strip ends lie substantially along the same vertical plane, without any appreciable end-to-end separation. However, in submerged arc, heliarc and certain other welding processes it is necessary or desirable to space the adjacent strip ends slightly prior to welding. Heretofore it has been proposed, for the purpose of obtaining the desired strip separation, to shift or back off one or both of the strip clamping assemblies with respect to the welding apparatus. And this general plan is advantageous in that the accurate alignment of the strip sections may be readily maintained.

In accordance with the improved arrangement of the present invention the entry-side clamping mechanism 42 is mounted upon a plate 62 which is supported on the base 10 for limited sliding movement in the direction of travel of the strip. The arrangement is illustrated in Figure 8, wherein the plate 62 is supported at its lateral edge portions by bearing plates 63 and 64, forming fixed parts of the machine base 10. Adjacent the side edges of the plate 62 are guide blocks 65 which define confining guide ways for the plate 62, permitting free sliding movement of the plate, but only in the desired direction.

Forming a part of the structure of the clamping device 42 are spaced side plates 66 which mount at their forward edges a pair of bearing blocks 67 having angularly disposed front faces, as shown in Figure 10. In accordance with the teachings of the invention the bearing blocks 67 bear against angularly disposed cam portions 68' of a transversely disposed operating rod 68, which is retained in bearings 69 in the base 10 for limited transverse movement with respect to the base.

As will be observed, the cam areas 68' form a forward limit position for the blocks 67, and hence for the entire clamping assembly 42. And to maintain the assembly 42 in such forward position there is provided a plurality of springs 70 (see Figure 9) acting between the base 10 and the clamp assembly 42 to urge the latter in a forward direction at all times.

Normally it is desired to maintain the clamp 42 in its forwardmost position, which may be accomplished by shifting the operating rod 68 to the left, into the position shown in Figure 10. A spring 71 is provided for this purpose, the same being positioned on the rod 68 and acting on the left hand bearing 69 to urge the rod to the left at all times.

After the shearing operations have been completed, carriage 13 is shifted to the right, for welding, and at this time it is desirable to retract the clamp assembly 42. Therefore, I provide a projecting member 72 (Figure 5) on the carriage 13 which is adapted, upon sufficient transverse movement of the carriage, to engage a projecting stop 73 on the rod 68. And upon further movement of the carriage to the right the rod 68 is carried along, against the action of the spring 71.

Of course, when the operating rod 68 is shifted to the right the bearing blocks 67 are acted upon by the cam portions 68' of the rod to shift the clamp assembly 42 in the manner desired, providing a predetermined separation between adjacent strip ends preparatory to the welding operation.

For accommodating materials of various sizes and properties suitable means are provided for adjusting the back-off of the clamp 42 so that the strip separation may be best suited to the welding conditions. Thus, in accordance with the teachings of the present invention, the stop 73, carried by the operating rod 68, is adjustable longitudinally along the rod, adjusting nuts 74 and 75 being provided for this purpose. The arrangement is such that by adjusting the nuts 74 and 75 the stop 73 is engaged at an earlier or later point in the traverse of the carriage 13. For example, if the stop 73 is adjusted to the right along the rod 68 is will be engaged at a later point in the traverse of the carriage 13, and its movement will be of less magnitude, resulting in a smaller back-off movement of the clamp 42.

After the strip ends have been properly clamped and spaced the platen actuating cylinder 33a is energized, raising the welding platen 24, so that the strip ends are clamped between the platen 24 and clamping plates 26.

The actual welding operation may then be carried out.

In accordance with preferred submerged arc welding practice, a quantity of flux is first applied to an area adjacent one edge of the strip, where the weld will begin, whereupon an arc is struck between the strip and welding rod. The rod is then moved along the interstice between the adjacent strip ends, being submerged in flux at all times, and the strip ends are fused together through the medium of the welding rod material which is melted and deposited along the interstice.

Figure 2:
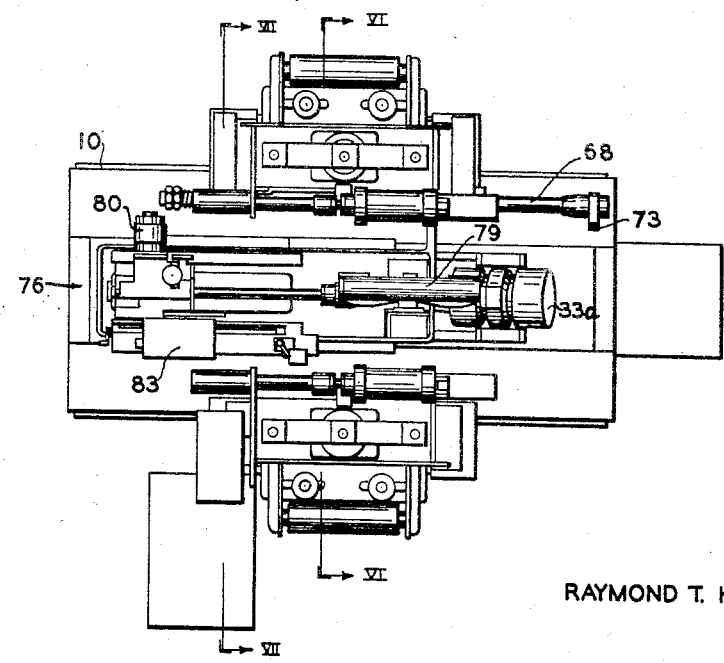
Figure 2 is a top plan view of the apparatus of Figure 1.
Figure 3:
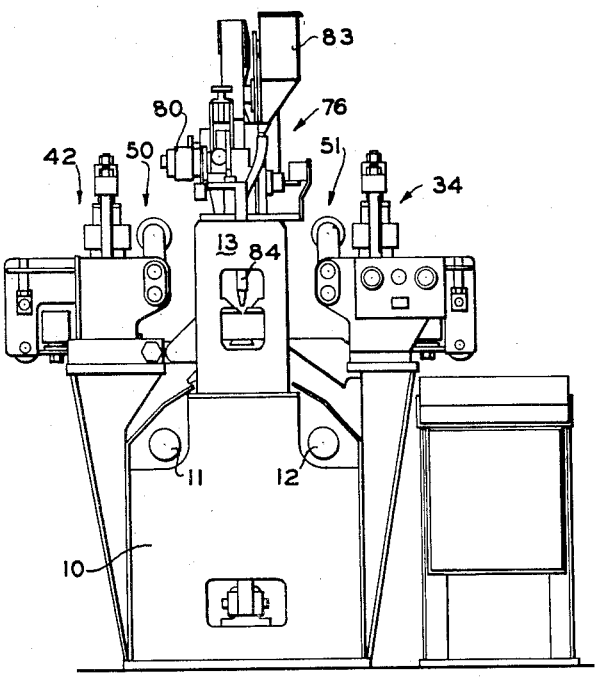
Figure 3 is a side elevation of the apparatus of Figure 1.

The present invention contemplates the employment of a welding head 76 of more or less conventional construction which is mounted at the top of the carriage 13, in the manner shown in Figures 1–3. The mechanism includes a welding gun 77 which is mounted for transverse movement along the carriage, over the welding platen 24. Conventionally, the gun 77 houses welding wire 78, which is fed to the welding zone from a supply coil 79, the feeding being monitored by a drive motor 80 and suitable control panel 81 (see Figure 11).

Positioned slightly ahead of the welding gun 77 is a supply tube 82 for flux material, which communicates with a supply hopper 83. And there is provided a suitable valve device for causing flux to be deposited on the work ahead of the welding gun 77 during welding operations. Also, positioned slightly behind the welding gun is a suction tube 84 which follows the welding operation, removing excess flux, and such flux is subsequently processed to remove foreign matter therefrom and reused.

To move the welding gun transversely of the carriage 13, during welding operations, I have provided a hydraulic cylinder 85, which, in accordance with the teachings of the invention, is provided with an accurately adjustable flow control valve 85' (Figure 11) whereby a smooth and readily adjustable movement of the gun 77 may be obtained. Heretofore it has been common practice to employ screw devices and the like for manipulating the welding gun. However, I have found that the arrangement of the present invention, in addition to being a substantial simplification, is productive of superior welding results than has been experienced in the past.

The control system (Figure 11) of the present invention is best described with reference to the operation of the welding apparatus, which is as follows:

As a coil of strip material is exhausted, and the trailing end thereof comes to the welding apparatus, the strip is stopped. The carriage 13, of course, is at this time positioned so that the shear blades 19 and 20 are aligned with the material.

After the strip is stopped the same is centered and clamped in the clamping assembly 34. In some cases this may be accomplished by first energizing the operating cylinder for the centering mechanism 51 and then energizing the exit side clamping cylinder 37. However, for most applications, both cylinders may be simultaneously energized as the centering cylinder is smaller and will act more rapidly than the clamping cylinder. Thus, in the present illustration I have provided a single solenoid valve 86 for energizing both of the above mentioned cylinders; and this valve is controlled through an energizing switch 87 and relay 88.

When the trailing end of the first strip is thus centered and clamped switch 89 is closed which energizes a control relay 90 and coil "U" of a solenoid valve 91, admitting fluid to the rod end of the shear actuating cylinder 33a. The carrier 18 and shear blade 19 thereupon move upwardly to shear off the trailing end of the first strip. As the shearing operation is completed a limit switch 92 (left in Figure 11) opens the energizing circuit for relay 90, closing valve 91. And as the relay 90 drops out, a pair of normally closed contacts thereof complete the energizing circuit for a control relay 93. The relay 93 thereupon completes a second energizing circuit through coil "D" of solenoid valve 91, which admits fluid to the head end of cylinder 33a, causing the carrier 18 to be lowered into the position shown in Figure 4.

The second coil may be threaded through the guide rolls 48 and 49 and clamping assembly 42, at the entry side of the machine, during the time that the first coil is being clamped and sheared as above described. Then, when the first coil is properly prepared and positioned, the leading portion of the second coil is inserted between the shear blades.

When the new strip is properly positioned, a switch 94 is closed, energizing relay 95 and solenoid valve 96, so that the strip is properly centered and clamped by mechanisms 50 and 42 respectively. The second strip is then ready for shearing, and switch 89 is again closed, actuating the shear blade 19 in the sequence described above.

After both strip ends are clamped and sheared a switch 97 is closed, which energizes relay 98 and coil "F" of a solenoid valve 99. This admits fluid to the rod end of the carriage traverse cylinder 14, and the carriage 13 is moved to the right along the guide rods 11 and 12 until the welding platen 24 underlies the strip. And, of course, as the carriage 13 shifts to the right the operating rod 68 is picked up and shifted to the right, causing the entire clamping assembly 42 to back off a predetermined distance, depending upon the setting of the stop 73.

At this time the strip ends are properly spaced, preparatory to welding, and switch 100 is now closed, energizing relay 101 and coil "U" of valve 91. This admits fluid again to the rod end of cylinder 33a so that the welding platen 24 is brought into pressure engagement with the strip 21, it being observed that the plurality of springs 25 upon which the platen 24 is supported merely compress as the carrier 18 nears its upper limit position.

It should be noted that switches 89 and 100 both operate to energize coil "U" of valve 91, admitting fluid to cylinder 33a for raising the carrier 18. However the energizing circuit including switch 89 also includes a limit switch 92 which causes the carrier 18 to return to its normal lower position immediately upon completion of the shear, while the alternate circuit includes no equivalent means, the carrier remaining in its upper position, as is desired during welding.

The actual welding operation is initiated by closing switch 102, which simultaneously energizes relays 103 and 104, the latter of which operates only after a predetermined time delay following its energization. Relay 103, when it closes, energizes a solenoid valve or operator 105 which permits the flow of welding flux from the hopper 83 so that the area at which the weld is to begin is thoroughly covered prior to the start of the weld. At this same time relay 103 energizes the feed control panel 81 and motor 80, so that welding rod is fed toward the work, in addition to energizing a second time delay relay 106 which controls the operation of a weld contactor 107.

At predetermined times after the closing of the weld switch 102 the time delay relay 106 closes, initiating the flow of welding current, and time delay relay 104 closes, energizing coil "F" of a solenoid valve 108, which admits fluid to the rod end of the weld head traversing cylinder 85, the welding operation then progressing from left to right, as viewed in Figure 1. In accordance with the preferred teachings of the invention the speed of movement of the welding gun 77 is controlled by means of the adjustable flow regulating valve 85' provided in the fluid inlet line to the cylinder 85.

Immediately following the welding gun 77, of course, is the flux recovery suction tube 84 which picks up all loose flux particles for subsequent processing and reuse.

As the welding operation progresses, welding rod is consumed, and therefore the rod must be continually fed toward the work in order to obtain the desired continuity of operation. This is accomplished in the present illustration by the provision of a commercial control panel 81, forming no part of this invention, which automatically energizes the motor 80 in response to fluctuations in welding current so that proper arcing conditions are maintained at all times.

As the welding gun 77 nears the end of its traverse, a limit switch 109 (lower left, in Figure 11) is tripped, opening the energizing circuits for relays 103 and 104. Relay 103, of course, opens immediately. However the time delay relay 104 opens only after a predetermined delay following its de-energization. Thus, contacts 103c open immediately to stop further feeding of the welding rod 78, while transverse movement of the welding gun is continued as relay 104 remains closed; and welding current continues to flow, as relay 106 at this point remains in an energized condition. The flow of welding flux from the hopper 83 is also discontinued at this time, as contacts 103a open, de-energizing the flux control relay 105.

Upon continued movement of the welding gun 77 across the work, a limit switch 110 is tripped which opens the energizing circuit for relay 106 and for a normally energized control relay 111. Relay 106, while being of the delayed closing type, opens immediately upon de-energization and de-energizes the welding contactor 107, preventing further flow of welding current. And, upon de-energization of relay 111, contacts 111c thereof open to de-energize coil "F" of valve 108, while contacts 111b close, energizing relay 112 and coil "R" of valve 108. At this time fluid is directed through valve 108 to the head end of the weld traverse cylinder 85 causing the welding head 76 to be rapidly returned to its initial position at the left of the carriage 13.

Upon closing of contacts 112b, a circuit is completed through contacts 98b to coil "R" of the carriage traverse valve 99. Fluid is thereupon directed into the head end of cylinder 14, returning carriage 13 to its initial position, with shear blades 18 and 19 positioned adjacent the strip line.

It will be further noted that upon completion of the weld traverse, opening limit switch 110, contacts 111a open, breaking the energizing circuit for relays 88 and 95, the last mentioned circuit including conductors 113 and 114. The strip clamping valves 86 and 96 are de-energized at this time by opening of contacts 88a and 95a. And relay 90 is also de-energized upon opening of contacts 88c and 95c. In response to the de-energization of relay 90, coil "U" of valve 91 is de-energized and relay 93 and coil "D" of valve 91 are energized, returning the carrier 18 to its lower position. At this time the welded strip is entirely free and may be drawn through the welder for processing in the manner desired.

As the welding head 76 returns to its starting position a return limit switch 115 is opened, de-energizing relay 112, and consequently relay 93 and valve coils 108R and 91D, and also de-energizing valve coil 99R. And at this stage all relays and valve coils are in a de-energized condition (some relays being de-energized through interlocking circuits not specifically described) with the exception of relay 111, which is normally energized, except momentarily, upon opening of limit switch 110 at the completion of the weld.

Other circuit components shown in Figure 11 and not specifically described relate primarily to manual and "jogging" controls which are employed principally in set-up operations and the like.

It should now be apparent that I have carried out the object initially set forth. I have provided a combined "shear-welder" apparatus for preparing and joining strip sections in end-to-end relation which is substantially improved and simplified with respect to apparatus heretofore employed for the same purpose.

An important feature of the present invention resides in the unitary carriage arrangement housing both the shearing and welding apparatus, wherein a single actuating mechanism may be employed for shearing the strip ends preparatory to welding, and for holding such ends in accurate alignment during the actual welding operation. In conjunction with the above there is provided a novel control arrangement for the said single actuating mechanism whereby a first pattern of operation may be effected during shearing of the strip, and a second pattern of operation may be effected during welding operation, the result being a substantial simplification both in construction and operation of the apparatus, as will be readily apparent.

One of the novel features of the invention, which permits or renders practical the highly simplified construction mentioned above is the mounting of the welding platen 24 upon resilient supporting means whereby during shearing operations the platen 24 may come into contact with the upper clamping plates 26 during upward movement of the carrier 18. The arrangement, as will be understood, is such that the cylinder 33a may be actuated through a complete operating stroke regardless of whether a shearing or clamping operation is being performed.

Another advantageous feature of the invention resides in the combination with the above mentioned unitary carriage construction, having transverse movement with respect to the strip material, of my novel back-off mechanism for separating the adjacent ends of coils prior to welding. The arrangement herein proposed is of a highly compact and simplified nature, yet is substantially fool-proof in operation and capable of highly accurate adjustment so that optimum welding results may be obtained at all times.

A further important advantage of my invention resides in novel construction including a compact base slidably supporting a transversely movable shearing and welding carriage, the carriage being relatively narrow in the direction of travel of the strip and the base being fitted compactly about the carriage so that the strip holding clamps may be positioned substantially closer to the shearing and welding line. This arrangement is advantageous in that light gauge strip material may be more readily handled and more satisfactorily welded than has been possible with similar apparatus constructed in accordance with heretofore known principles.

It should be understood, however, that the single embodiment herein disclosed and specifically described is intended to be illustrative only, and reference should therefore be had to the following appended claims in determining the true scope of the invention.

I claim:

1. In a compact combined apparatus for shearing and welding strip, the combination of a base, a carriage supported on said base for transverse movement with respect to the pass line of said strip, said carriage having a window-like opening therein having mounted upon the upper edge thereof a welding platen and shear blade, said platen and blade being mounted in side-by-side downwardly facing relation, a unitary carrier member mounted in said window-like opening and guided therein for vertical movement, a welding platen and shear blade mounted on said carrier member in side-by-side upwardly facing relation, an operating device for said carrier member adapted upon actuation to effect a predetermined vertical movement thereof, and means to resiliently mount one of said welding platens.

2. Apparatus according to claim 1 further characterized by said operating device comprising a fluid cylinder mounted on said carriage, and a pair of spaced toggle linkages connecting said carrier member and said carriage and operable by said cylinder, and means to actuate said cylinder through a predetermined stroke.

3. In a combined apparatus for shearing the trailing and leading ends respectively of first and second strip sections, spacing said strip sections and welding the same together, said apparatus being of the type having a base, a movable carriage mounting shearing and welding apparatus, means to clamp said strip sections, and means to separate said means to clamp following shearing of said strip sections; the improvement comprising means mounting said carriage for transverse movement with respect to said base and the path of movement of said strip sections, said means to clamp comprising a first clamping mechanism mounted on said base and a second clamping mechanism mounted on said base for limited movement in the direction of movement of said strip, means to urge said second clamping mechanism in a first direction, and a transversely movable operating rod carried by said base and adapted to be engaged by said carriage during transverse movement thereof for moving said second clamping mechanism in a second direction.

4. Apparatus according to claim 3 further characterized by said operating rod having a stop member, and said carriage having a member for engaging said stop member during transverse movement of said carriage whereby to move said operating rod in a transverse direction, and one of said last mentioned members being adjustable whereby to regulate the movement of said second clamping mechanism in said second direction.

5. Apparatus according to claim 4 further characterized by said operating rod having angular cam portions thereon bearing upon portions of said second clamping mechanism, and means to urge said rod in a first direction, said carriage being adapted to move said rod in a second direction.

6. In a compact combined apparatus for shearing and welding strip sections the combination of a base, a carriage supported on said base for transverse movement with respect to the pass line of said strip, said combined shear and welder carriage having a carrier member therein mounting a shear blade and a welding platen in side-by-side relation, a fluid cylinder for actuating said carrier, a solenoid operated valve for actuating said cylinder, a first control circuit for energizing said valve during shearing operations, said first control circuit including a limit switch operative upon said carrier reaching an upper limit position to cause immediate return thereof to a lower position, and a second control circuit for energizing said valve during welding operations.

7. In a compact combined apparatus for shearing and welding strip sections, the combination of a base having upstanding end walls, a pair of spaced supports and guide rods anchored in said end walls, a combined shear and welder carriage supported by said rods and positioned between and extending substantially above and below the same, a unitary movable carrier member, said carrier member mounting a shear blade and a welding platen in side-by-side relationship, and a hydraulic cylinder mounted on said carriage and connecting said carrier for actuating the same during the shearing and welding operations, and a further hydraulic cylinder mounted on said base and connecting said carriage for moving the carriage transversely on said guide rods to position said shear and welder alternately in operative and inoperative positions.

8. The apparatus according to claim 7 further including a pair of toggle linkages connecting said carriage and carrier, and a horizontally disposed driving link connecting said toggle linkages, said last mentioned hydraulic cylinder being pivotally mounted on said carriage and connecting said driving link.

9. In a compact combined apparatus for shearing and welding strip the combination of a base, a carriage supported on said base for transverse movement with respect to the pass line of said strip, said carriage having a window-like opening therein, a single unitary carrier member guided in said window-like opening and mounting a shear blade and a welding platen in side-by-side relation, and an operating device for said carrier adapted upon actuation to effect a predetermined vertical movement thereof.

10. In a compact combined apparatus for shearing and welding strip the combination of a base, a carriage supported on said base for transverse movement with respect to the pass line of said strip, said carriage having a window-like opening therein, unitary carrier means guided in said window-like opening and mounting a shear blade and a welding platen in side-by-side relation, and a single operating device for said carrier means adapted to operate said shear blade and welding platen through predetermined vertical movements.

11. In a combined apparatus for shearing the trailing and leading ends respectively of first and second strip sections, spacing said strip sections and welding the same together, said apparatus being of the type having a base, a movable carriage mounting shearing and welding apparatus, means to clamp said strip section, and means to separate said means to clamp following shearing of said strip sections; the improvement comprising means mounting said carriage for transverse movement with respect to said base and the path of movement of said strip sections, said means to clamp comprising first and second clamping mechanisms mounted on said base, and cam means including means carried by said carriage operable upon transverse movement of said carriage from shearing to welding position to act upon at least one of said clamping mechanisms to retract the same from the other clamping mechanism whereby to effect a separating movement of adjacent sheared strip ends.

12. In a compact combined apparatus for shearing and welding strip sections the combination of a base, a pair of spaced parallel supporting surfaces extending from one end to the other end of said base in a direction transverse to the direction of movement of strip, a combined shear and welder carriage supported by said surfaces through a carrier, said carrier being positioned between and extending substantially above and below the same, and a hydraulic cylinder mounted on said base and connecting said carriage for moving the same transversely on said surfaces to position said shear and welder alternately in operative and inoperative positions.

References Cited in the file of this patent

UNITED STATES PATENTS

| | | |
|---|---|---|
| 1,320,895 | Murray | Nov. 4, 1919 |
| 2,078,365 | Biggert | Apr. 27, 1937 |
| 2,191,476 | Hopkins | Feb. 27, 1940 |
| 2,272,737 | Chapman | Feb. 10, 1942 |
| 2,453,900 | Gardiner et al. | Nov. 16, 1948 |
| 2,459,625 | Copp | Jan. 18, 1949 |
| 2,525,862 | Carpenter | Oct. 17, 1950 |
| 2,641,673 | Dahl | June 9, 1953 |
| 2,683,432 | Schanz | July 13, 1954 |